(12) United States Patent
Nakajima et al.

(10) Patent No.: US 9,382,966 B2
(45) Date of Patent: Jul. 5, 2016

(54) VEHICLE BODY REINFORCEMENT UNIT

(71) Applicant: AISIN SEIKI KABUSHIKI KAISHA, Kariya (JP)

(72) Inventors: Nobuhisa Nakajima, Chiryu (JP); Morito Oshita, Kariya (JP); Fumio Kojima, Nagoya (JP); Takashi Kondo, Toyota (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/308,004

(22) Filed: Jun. 18, 2014

(65) Prior Publication Data

US 2014/0375041 A1    Dec. 25, 2014

(30) Foreign Application Priority Data

Jun. 19, 2013 (JP) .................. 2013-128675
Jun. 19, 2013 (JP) .................. 2013-128676

(51) Int. Cl.
*B62D 21/15* (2006.01)
*F16F 7/08* (2006.01)
*F16F 9/32* (2006.01)

(52) U.S. Cl.
CPC .............. *F16F 9/3207* (2013.01); *B62D 21/15* (2013.01); *F16F 7/08* (2013.01); *F16F 2228/08* (2013.01); *F16F 2230/0005* (2013.01)

(58) Field of Classification Search
CPC .... F16F 9/3207; F16F 7/08; B60G 2206/014; B60G 2206/605; B62D 21/15
USPC .............. 280/784; 296/187.03; 248/352
See application file for complete search history.

(56) References Cited

U.S. PATENT DOCUMENTS

| | | | |
|---|---|---|---|
| 4,281,487 A * | 8/1981 | Koller | 52/167.1 |
| 7,673,904 B2 | 3/2010 | Harada et al. | |
| 2002/0056969 A1 * | 5/2002 | Sawai et al. | 280/124.146 |

FOREIGN PATENT DOCUMENTS

| | | | | |
|---|---|---|---|---|
| JP | H05-116648 A | 5/1993 | | |
| WO | WO 9204555 A1 * | 3/1992 | ............... | F16F 7/09 |
| WO | WO 2006/090586 A1 | 8/2006 | | |

* cited by examiner

*Primary Examiner* — Keith Frisby
(74) *Attorney, Agent, or Firm* — Buchanan Ingersoll & Rooney PC

(57) ABSTRACT

A vehicle body reinforcement unit includes a reinforcement member disposed between a pair of frame portions of a vehicle body and including a pair of displacement members that is displaced relative to each other in association with a relative displacement of the pair of frame portions, the reinforcement member including a damping mechanism that applies a damping force to a relative operation of the pair of displacement members.

7 Claims, 11 Drawing Sheets

VEHICLE BODY REINFORCEMENT UNIT

CROSS REFERENCE TO RELATED APPLICATIONS

This application is based on and claims priority under 35 U.S.C. §119 to Japanese Patent Application 2013-128675, filed on Jun. 19, 2013, and Japanese Patent Application 2013-128676, filed on Jun. 19, 2013, the entire contents of which are incorporated herein by reference.

TECHNICAL FIELD

This disclosure generally relates to a vehicle body reinforcement unit.

BACKGROUND DISCUSSION

A known vehicle body reinforcement unit is disclosed in JP05-116648A which will be hereinafter referred to as Reference 1. The vehicle body reinforcement unit disclosed in Reference 1 includes right and left side members constituting a vehicle body frame and a suspension cross member connecting the right and left side members each other. The aforementioned vehicle body reinforcement unit also includes right and left reinforcement members (i.e., braces). One end of each of the reinforcement members is connected and fixed to a center portion of the suspension cross member in a right-left direction. The other end of each of the reinforcement members is connected and fixed to each of the corresponding side members.

In the vehicle body reinforcement unit disclosed in Reference 1, an iron pipe member of which opposed ends are crushed to form flange portions constitutes each of the reinforcement members (i.e., the braces). One end of each of the reinforcement members is fixed by a bolt to the suspension cross member while the other end of the reinforcement member is fixed by a bolt to the corresponding side member.

A known vehicle body reinforcement unit is also disclosed in WO2006/090586A1 which will be hereinafter referred to as Reference 2. The vehicle body reinforcement unit disclosed in Reference 2 includes a reinforcement member (i.e., a reinforcement apparatus for a vehicle body), which is provided to be removable, along a side frame that extends in a front-rear direction in a vehicle body frame in a state where a longitudinal direction of the reinforcement member coincides with the font-rear direction.

The reinforcement member disclosed in Reference 2 includes a piston that is movable within a hydraulic cylinder and a piston rod provided at the piston. Oil is filled within the hydraulic cylinder so that a flow of oil is restricted or regulated in a case where the piston is operated to expand and contract a volume of the hydraulic cylinder, which leads to generation of a damping force. An outer end portion of the hydraulic cylinder of the reinforcement member including the aforementioned configuration and an end portion of the piston are connected to a predetermined frame of the vehicle body so as to generate the damping force.

According to the vehicle body reinforcement unit disclosed in Reference 1, each of the reinforcement members includes a simple configuration, which may lead to a reduced cost for achieving reinforcement of the vehicle body and to an easy mounting and removing. On the other hand, a function for damping vibration of the vehicle body is not provided.

In addition, according to the vehicle body reinforcement unit disclosed in Reference 2, a force may be generated for restraining expansion and contraction operation of the piston rod (the piston) within the hydraulic cylinder of the reinforcement member. That is, the vehicle body reinforcement unit disclosed in Reference 2 includes a function for retraining vibration of the vehicle body, which improves a vehicle ride quality. In addition, according to the vehicle body reinforcement unit disclosed in Reference 2, opposed end portions of the reinforcement member are provided at an outer side of the vehicle body frame (i.e., monocoque body) to face a road surface. That is, the mounting and removing of the reinforcement member by a user is considered. Nevertheless, a large number of components of the reinforcement unit may increase cost and decrease general versatility.

A vehicle body frame of a passenger vehicle (vehicle), which includes a predetermined rigidity, is expected to improve ride quality depending on one's taste by including the reinforcement member. It is desirable for the reinforcement member mounted to the vehicle to ease impact caused by possible external force applied to the vehicle body frame and restrain vibration at the vehicle body in addition to improving rigidity of the vehicle body frame. Further, in a case where the reinforcement member is provided, the reinforcement member may be mounted to an outer side or a bottom side of the vehicle body frame so as not to decrease maintainability or occupant comfort, for example.

A need thus exists for a vehicle body reinforcement unit which is not susceptible to the drawback mentioned above.

SUMMARY

According to an aspect of this disclosure, a vehicle body reinforcement unit includes a reinforcement member disposed between a pair of frame portions of a vehicle body and including a pair of displacement members that is displaced relative to each other in association with a relative displacement of the pair of frame portions, the reinforcement member including a damping mechanism that applies a damping force to a relative operation of the pair of displacement members.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
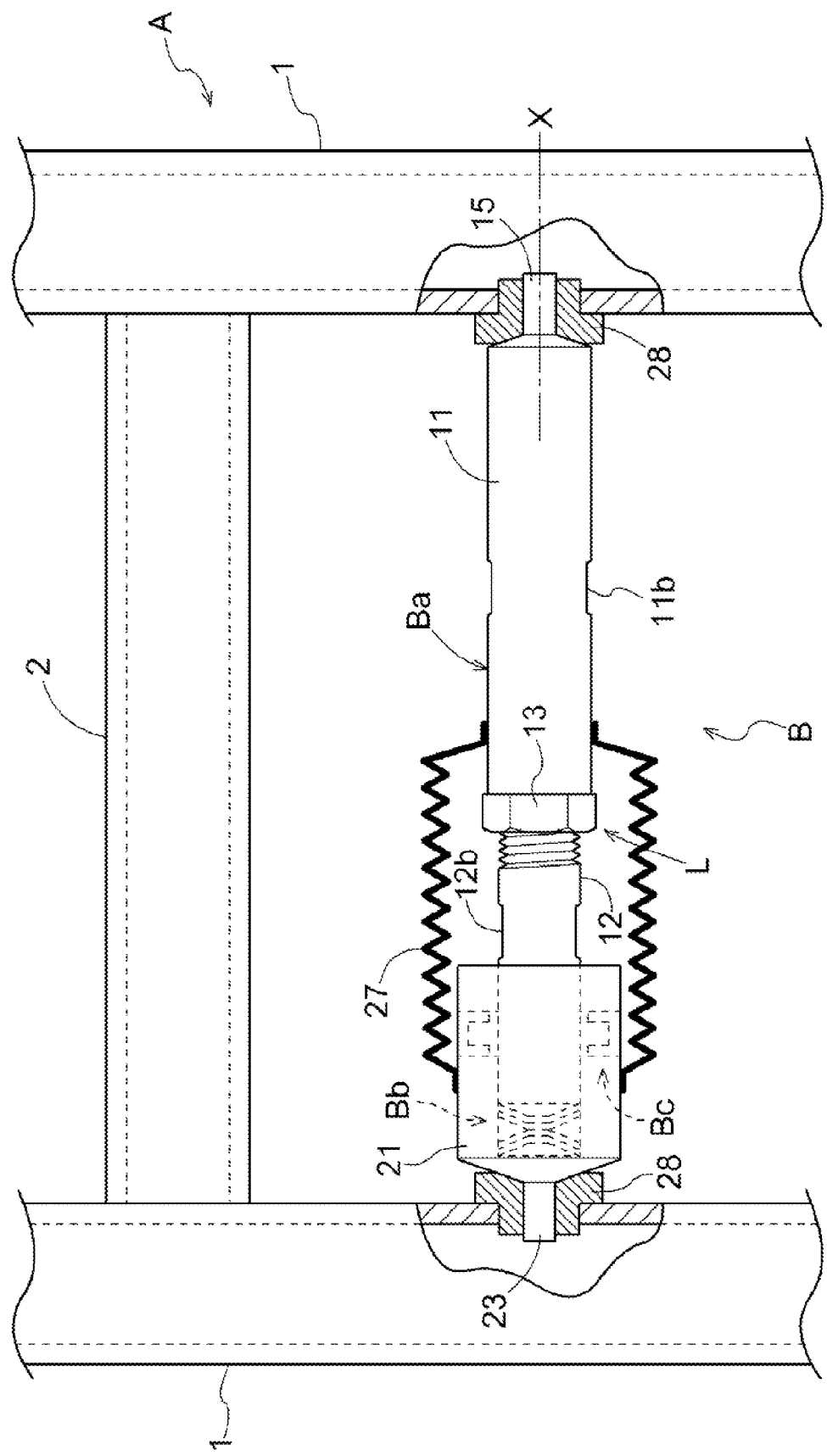
FIG. 1 is a plan view of a vehicle body reinforcement unit mounted in a first mounting state at a vehicle body according to a first embodiment disclosed here.
Figure 2:
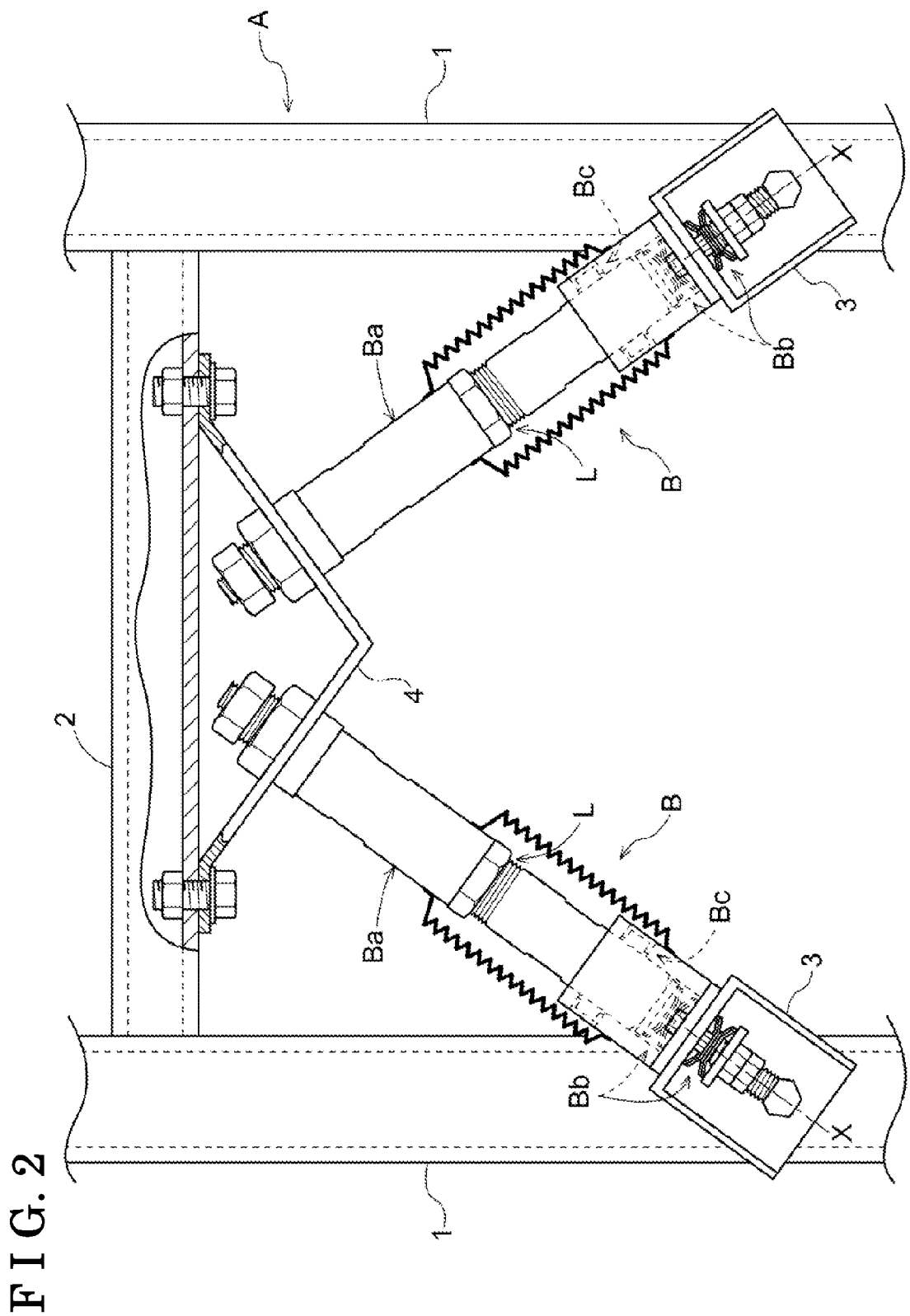
FIG. 2 is a plan view of a pair of vehicle body reinforcement units mounted in a second mounting state at the vehicle body according to a second embodiment disclosed here.

Embodiments of this disclosure will be explained with reference to the attached drawings. As illustrated in FIGS. 1 and 2, a vehicle body A of a passenger vehicle (vehicle) includes right and left side members 1 and a cross member 2 of which opposed ends are connected to the respective side members 1. The right and left side members 1 serve as a pair of frame portions. The pair of frame portions corresponds to a first end portion and a second end portion.

In the embodiments, a vehicle body reinforcement unit B is arranged in a first mounting state as illustrated in FIG. 1 and a pair of vehicle body reinforcement units B are arranged in a second mounting state as illustrated in FIG. 2. Specifically, in the first mounting state, a reinforcement member Ba of the vehicle body reinforcement unit B is arranged to bridge over the right and left side members 1 so that a longitudinal direction of the reinforcement member Ba corresponds to a right-left direction. In the second mounting state, a pair of reinforcement members Ba of the pair of vehicle body reinforcement units B is arranged to extend between a substantially center portion of the cross member 2 and the respective corresponding right and left side members 1.

In the second mounting state, the right and left side members 1, and the cross member 2 serve as the pair of frame portions. That is, either the right and left side members 1 or the cross member 2 serve(s) as one of the pair of frame portions while either the right and left side members 1 or the cross member 2 not serving as one of the pair of frame portions serve(s) as the other of the pair of frame portions. Each of the vehicle body reinforcement units B is arranged to extend between a side bracket 3 provided at each of the side members 1 and a center bracket 4 provided at the cross member 2.

The vehicle body reinforcement unit B illustrated in FIGS. 1 and 2 is mounted at a bottom wall side of the vehicle body A. At this time, the vehicle body reinforcement unit B is not limited to be mounted at the bottom wall side of the vehicle body A and may be arranged in a region at a vehicle interior or a vehicle exterior along a front-rear direction of the vehicle body A. For example, the vehicle body reinforcement unit B may be disposed at a front side of a trunk to extend along the front-rear direction. The mounting state is not limited to the aforementioned embodiments. Specifically, the vehicle body reinforcement unit B may be mounted at a bore portion formed at each of the side members 1, for example, or removed therefrom by a user by himself/herself.

Figure 3:
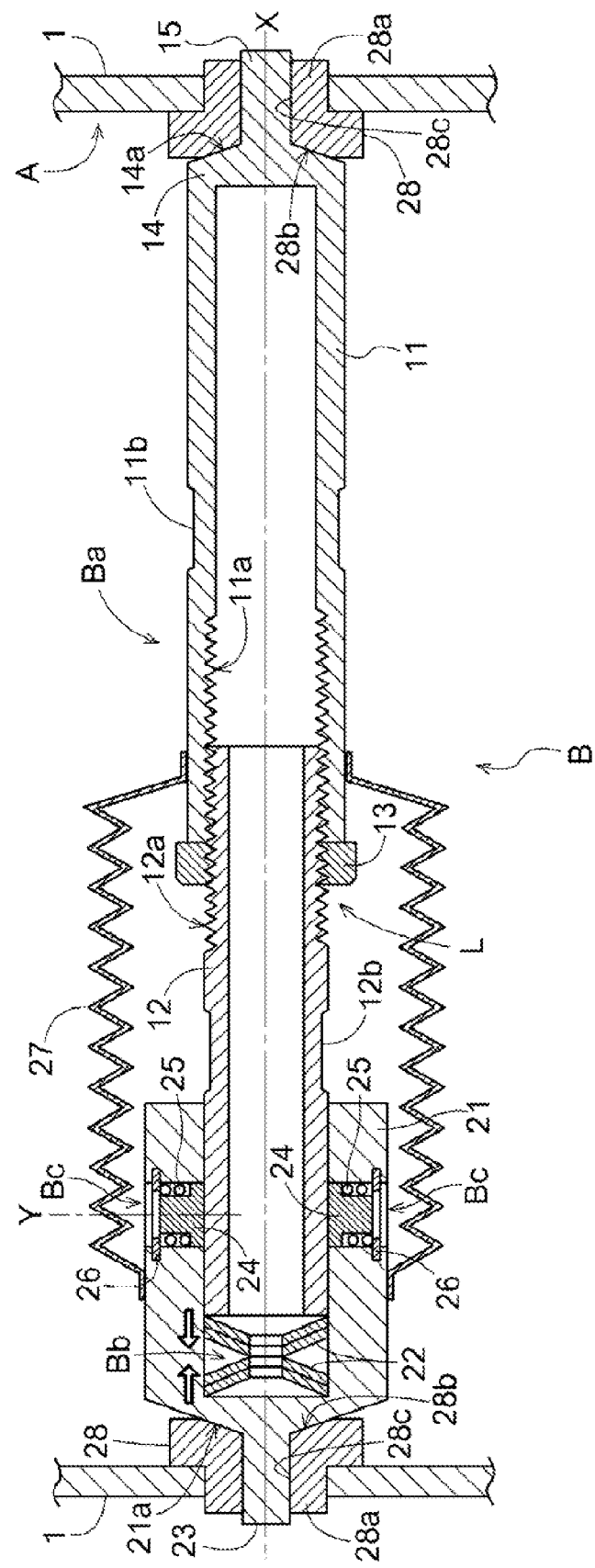
FIG. 3 is a cross-sectional view of the vehicle body reinforcement unit according to the first embodiment.

A first embodiment will be explained with reference to FIGS. 1 and 3. As illustrated in FIGS. 1 and 3, the vehicle body reinforcement unit B in the first embodiment includes the reinforcement member Ba supported at one of the right and left side members 1, a displacement restraining mechanism Bb that generates a biasing force against a contraction displacement in which a relative distance between the right and left side members 1 is reduced, and an operation damping mechanism Bc serving as a damping mechanism.

The reinforcement member Ba includes an outer cylinder 11 in a cylindrical form including an axis corresponding to a main axis X serving as an axis, an inner cylinder 12 in a cylindrical form, a lock nut 13, and a slide holder 21. The inner cylinder 12 serves as an inner fitting portion and the slide holder 21 serves as a cylinder portion. The outer cylinder 11 includes an internal thread portion 11a at an inner periphery. The inner cylinder 12 includes an external thread portion 12a at an outer periphery, the external thread portion 12a threadedly engaging with the internal thread portion 11a of the outer cylinder 11. The lock nut 13 is threadedly engaged with the external thread portion 12a of the inner cylinder 12. A pair of first operation surfaces 11b is formed in parallel to each other at an outer periphery of the outer cylinder 11. In addition, a pair of second operation surfaces 12b is formed in parallel to each other at the outer periphery of the inner cylinder 12.

A fixation holder 14 is fixed to an outer end portion of the outer cylinder 11 facing one of the side members 1 at which the reinforcement member Ba is supported (i.e., a right end portion of the outer cylinder 11 in FIG. 3). A first fitting surface 14a serving as a rotating inclined surface is formed at the fixation holder 14 in such a way that the diameter of the first fitting surface 14a is reduced towards the outer end portion of the outer cylinder 11 along the main axis X. A first engagement rod 15 is formed at the outer end portion of the outer cylinder 11 to project outwardly and coaxially with the main axis X.

The displacement restraining mechanism Bb includes the slide holder 21 and plural displacement restraining springs 22. The slide holder 21 in a cylindrical form (i.e., including a cylindrical portion) with a bottom portion is externally fitted to an outer end portion of the inner cylinder 12 positioned away from the outer cylinder 11 (i.e., a left end portion of the inner cylinder 12 in FIG. 3). The slide holder 21 is slidable in the direction of the main axis X. Plural displacement restraining springs 22 formed by disc springs and serving as a biasing member are disposed between the bottom portion of the slide holder 21 and the outer end portion of the inner cylinder 12. A second fitting surface 21a serving as a tapered surface is formed at an outer end portion of the slide holder 21 (i.e., a left end portion of the slide holder 21 in FIG. 3). The diameter of the second fitting surface 21a is reduced towards the outer end portion of the slide holder 21 along the main axis X. A second engagement rod 23 is formed at the outer end portion of the slide holder 21 to project outwardly and coaxially with the main axis X.

In a case where the right and left side members 1 are displaced so that a relative distance between the right and left side members 1 decreases, i.e., contraction displacement occurs, the displacement restraining mechanism Bb functions such that a biasing force of the displacement restraining springs 22 operates as a force against the aforementioned contraction displacement. The biasing force of the displacement restraining springs 22 is adjustable and changeable by changes of the number of disc springs that function as the displacement restraining springs 22, a direction in which the disc springs overlap each other, or an initial compression height of the disc springs, for example. By the changes of the number of disc springs or the overlapping direction of the disc springs by a user, for example, a desirable ride quality is achievable. Such method for changing the biasing force is not limited to the first embodiment and is applicable to the other embodiments which will be explained later where the disc springs are provided.

The operation damping mechanism Bc includes friction members 24, spring bodies 25, and retaining rings 26. The friction members 24 (biasing portions) are fitted to bore portions formed at the cylindrical portion of the slide holder 21. The friction members 24 serve as pressing members pressing the inner cylinder 12, for example. The bore portions are formed at the cylindrical portion of the slide holder 21 to be coaxial with plural orthogonal axes Y orthogonal to the main axis X. Each of the spring bodies 25 serving as a biasing body is formed by a coil spring for generating a biasing force so that each of the friction members 24 makes pressure-contact with the outer peripheral surface of the inner cylinder 12 to generate a friction force. The retaining rings 26 inhibit the spring bodies 25 from disengaging. In the first embodiment, the inner cylinder 12 and the slide holder 21 serve as a pair of displacement members respectively.

In the operation damping mechanism Bc of the present embodiment, it is assumed that the friction member 24 make direct contact with the outer peripheral surface of the inner cylinder 12. Alternatively, a polymeric film or a resin film, for example, may be formed at the outer peripheral surface of the inner cylinder 12 for obtaining a necessary damping force. The aforementioned configuration for obtaining a necessary friction force is not limited to the first embodiment and is applicable to the other embodiments including the similar configurations.

In a case where a force is generated for causing the right and left side members 1 to come closer to each other along the main axis X so that the inner cylinder 12 and the slide holder 21 operate relative to each other in a contracting direction, i.e., in a direction where the inner cylinder 12 is inserted to the slide holder 21, the operation damping mechanism Bc generates a resistance force resulting from the friction between the friction members 24 and the outer peripheral surface of the inner cylinder 12 (damping force) to be applied to a relative movement between the inner cylinder 12 and the slide holder 21. As a result, the relative movement is damped.

The vehicle body reinforcement unit B includes a bellows 27 made of flexible material such as rubber and resin, for example, for blocking intrusion of dust or dirt to a boundary portion between the outer periphery of the inner cylinder 12 and the slide holder 21 so as to inhibit adhesion of dust or dirt to the outer periphery of the inner cylinder 12.

Right and left support plugs 28 serving as support members are fitted to respective fitting bores formed at surfaces of the right and left side members 1 facing each other. The fitting bores are formed to be coaxial with the main axis X. Each of the support plugs 28 includes a fitting protruding portion 28*a* inserted to be positioned within the corresponding fitting bore of the side member 1, a recess surface 28*b* in a funnel form coming closer to the main axis X towards an outer end side, i.e., towards the corresponding side member 1, and an engagement bore 28*c* formed to be coaxial with the main axis X.

In a case where the vehicle body reinforcement unit B including the aforementioned configuration is assembled between the right and left side members 1, a length of the reinforcement member Ba in the direction of the main axis X (i.e., a length constituted by the outer cylinder 11 and the inner cylinder 12) is shortened and then the first engagement rod 15 and the second engagement rod 23 are brought to engage with the corresponding engagement bores 28*c* of the support plugs 28.

In the aforementioned state, the outer cylinder 11 and the inner cylinder 12 are relatively rotated to each other so that the fitting protruding portions 28*a* of the right and left support plugs 28 are fitted to the corresponding fitting bores of the right and left side members 1. The right and left side members 1, the right and left support plugs 28, the fixation holder 14, and the slide holder 21 are brought to tightly contact one another in the direction of the main axis X so that an initial load is generated in the displacement restraining springs 22. In such state, the lock nut 13 is made contact with an inner end portion of the outer cylinder 11 at an opposite side of the outer end portion along the main axis X (i.e., a left end portion of the outer cylinder 11 in FIG. 3) to fix an elongated amount of the outer cylinder 11 and the inner cylinder 12 as a whole. Accordingly, the relative rotation between the outer cylinder 11 and the inner cylinder 12 constitutes a screw-type length adjusting portion L for adjusting the length of the reinforcement member Ba.

An assembly order may be specified in a way that the right and left support plugs 28 are fitted to the respective fitting bores of the right and left side members 1 in advance and then the reinforcement member Ba is elongated to engage the first engagement rod 15 and the second engagement rod 23 with the corresponding engagement bores 28*c* of the right and left support plugs 28.

Accordingly, in a state where the reinforcement member Ba is assembled, the first fitting surface 14*a* of the fixation holder 14 is in contact with the recess surface 28*b* of one of the support plugs 28, and the second fitting surface 21*a* of the slide holder 21 is in contact with the recess surface 28*b* of the other of the support plugs 28. Further, the right and left support plugs 28 are in contact with the corresponding right and left side members 1.

Specifically, the recess surface 28*b* of each of the support plugs 28 includes a centering function. The first fitting surface 14*a* and the corresponding recess surface 28*b* in contact with each other and the second fitting surface 21*a* and the corresponding recess surface 28*b* in contact with each other come close to the main axis X so that the position of the main axis X is determined. The position of the main axis X is maintained and retained to be orthogonal to the right and left side members 1.

In order to bring the outer cylinder 11 and the inner cylinder 12 to relatively rotate each other, a tool such as a wrench or a spanner, for example, is placed at the first operation surfaces 11*b* of the outer cylinder 11 and the second operation surfaces 12*b* of the inner cylinder 12 to achieve the relative rotation of the outer cylinder 11 and the inner cylinder 12. The lock nut 13 is also rotated by a tool such as a wrench or a spanner, for example. After the outer cylinder 11 and the inner cylinder 12 are locked to each other by the lock nut 13, opposed ends of the bellows 27 are fixed to the slide holder 21 and the outer cylinder 11 as illustrated in FIG. 3.

In the vehicle body reinforcement unit B of the first embodiment, in a case where an external force is applied to a vehicle body frame to displace the right and left side members 1 to approach each other, the reinforcement member Ba (the outer cylinder 11 and the inner cylinder 12) is displaced in a direction where the inner cylinder 12 is inserted to the slide holder 21. Because of the aforementioned displacement, the plural displacement restraining springs 22 of the displacement restraining mechanism Bb are compressed, which leads to the biasing force of the displacement restraining springs 22 operating in a direction against the displacement, thereby restraining the displacement of the right and left side members 1 in the direction approaching each other.

In the vehicle body reinforcement unit B, in a case where the right and left side members 1 are displaced in the direction approaching each other and the reinforcement member Ba (the outer cylinder 11 and the inner cylinder 12) is displaced in a direction where the inner cylinder 12 is inserted to the slide holder 21, the friction members 24 of the operation damping mechanism Bc in press-contact with the outer periphery of the inner cylinder 12 generate the friction force. The friction force of the friction members 24 leading to the damping force is applied to the relative movement between the slide holder 21 and the inner cylinder 12 (the outer cylinder 11) to damp the relative movement. Accordingly, not only a rapid displacement of the reinforcement member Ba is restrained but also amplitude of vibration of the reinforcement member Ba is reduced in a case where vibration is generated upon the displacement.

In a second embodiment, being different from the vehicle body reinforcement unit B of the first embodiment, in a case where a force is applied to the vehicle body reinforcement unit B in either a contracting direction where a relative distance between the right and left side members 1 decreases or an expanding direction where the relative distance between the right and left side members 1 increases, the displacement restraining mechanism Bb generates a force against the displacement of the vehicle body reinforcement unit B, and the operation damping mechanism Bc damps the displacement. Specifically, in the second embodiment, the main axis X of each of the vehicle body reinforcement units B in the second mounting state is inclined relative to the front-rear direction of the vehicle body A. Thus, the vehicle body reinforcement unit B functions in both cases where the right and left side members 1 are displaced to an inner side or an outer side in the direction along the main axis X, and where the right and left side members 1 are displaced in the front-rear direction.

Figure 4:
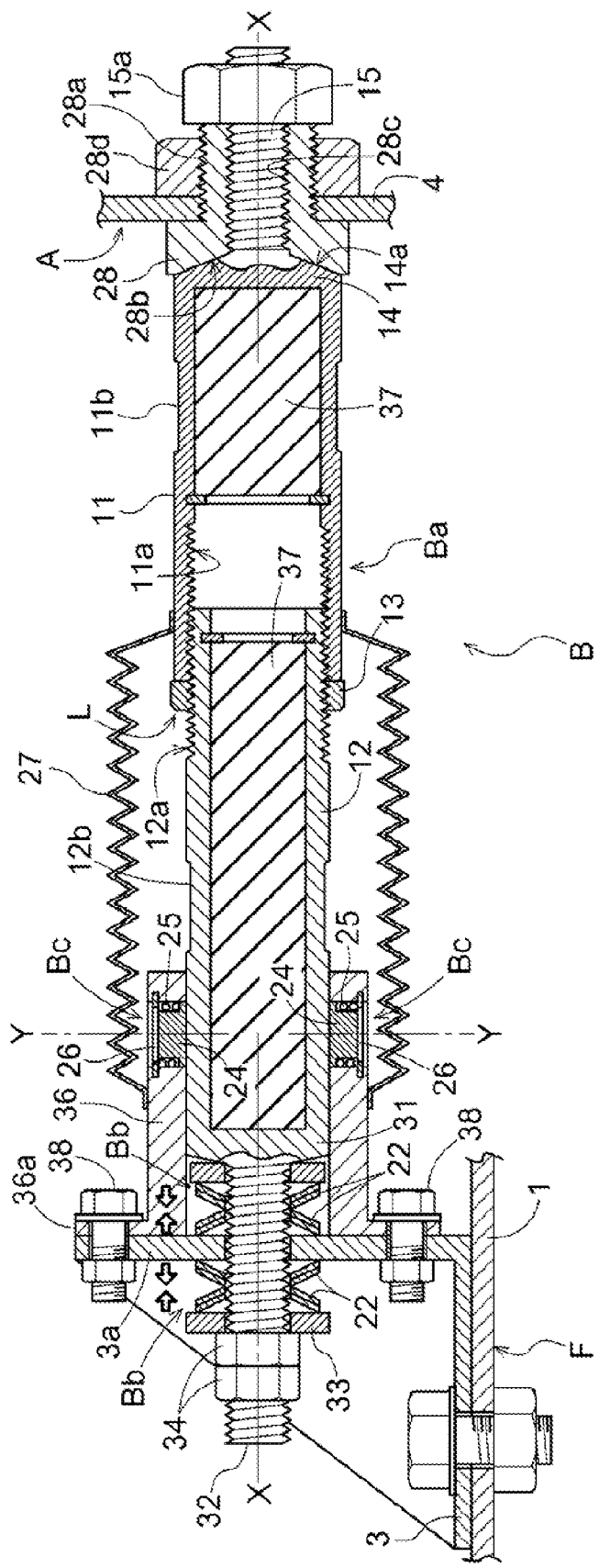
FIG. 4 is a cross-sectional view of the vehicle body reinforcement unit according to the second embodiment.

As illustrated in FIGS. 2 and 4, in each of the vehicle body reinforcement units B of the second embodiment, the reinforcement member Ba includes the outer cylinder 11, the inner cylinder 12, and the lock nut 13 in the same way as the first embodiment. The fixation holder 14 is fixed to the outer end portion of the outer cylinder 11 (i.e., the right end portion of the outer cylinder 11 in FIG. 4). The fixation holder 14 includes the first fitting surface 14a in a tapered form of which diameter is reduced towards an outer end thereof (i.e., a right end in FIG. 4) along the main axis X. The first engagement rod 15 is formed at an outer end side of the first fitting surface 14a (i.e., a right side of the first fitting surface 14a in FIG. 4) to project outwardly and coaxially with the main axis X. Further, a threaded portion is formed at an outer periphery of the first engagement rod 15.

The vehicle body reinforcement unit B of the second embodiment includes the support plug 28 serving as the support member with which the first engagement rod 15 engages. The support plug 28 includes the fitting protruding portion 28a and the engagement bore 28c. A threaded surface is formed at an outer periphery of the fitting protruding portion 28a. In addition, a threaded surface is formed at an inner periphery of the engagement bore 28c.

A screw shaft 32 is formed to project via a connection plate 31 at the outer end portion (i.e., the left end portion in FIG. 4) of the inner cylinder 12 of the reinforcement member Ba along the main axis X. The plural displacement restraining springs 22 formed by the disc springs that serve as the biasing member are externally fitted to the screw shaft 32 so as to be positioned to sandwich a plate portion 3a of the side bracket 3 to thereby constitute two of the displacement restraining mechanisms Bb. A flat washer 33 is externally fitted to the screw shaft 32 to be positioned at the outer side (i.e., the left side in FIG. 4) than the plural displacement restraining springs 22. Plural nuts 34 are threadedly engaged with the screw shaft 32.

The displacement restraining mechanisms Bb are configured to include the plural displacement restraining springs 22 in the aforementioned manner. The displacement restraining springs 22 positioned at the outer side (i.e., the left side in FIG. 4) (which will be hereinafter referred to as the outer displacement restraining springs 22) serve as a first biasing member and the displacement restraining springs 22 positioned at the inner side (i.e., the right side in FIG. 4) (which will be hereinafter referred to as the inner displacement restraining springs 22) serve as a second biasing member. In a case where the right and left side members 1 are displaced in a direction where the relative distance therebetween increases (i.e., expansion displacement), the outer displacement restraining springs 22 generate the biasing force against the increase of the relative distance between the right and left side members 1 (i.e., the biasing force that restrains the increase of the relative distance). In a case where the right and left side members 1 are displaced in a direction where the relative distance therebetween decreases (i.e., contraction displacement), the inner displacement restraining springs 22 generate the biasing force against the decrease of the relative distance between the right and left side members 1 (i.e., the biasing force that restrains the decrease of the relative distance). In the other embodiments which will be explained later, the displacement restraining spring(s) 22 that generates the biasing force in a direction against the increase of the relative distance between the frame portions (for example, the side members 1) serves as the first biasing member. The displacement restraining spring(s) 22 that generates the biasing force in a direction against the decrease of the relative distance between the frame portions (for example, the side members 1) serves as the second biasing member.

A slide support member 36 is provided at the outer end portion of the inner cylinder 12 of the reinforcement member Ba. The slide support member 36 serves as the cylinder portion. Specifically, the slide support member 36 is externally fitted to the outer end portion of the inner cylinder 12 to be slidable along the main axis X. The slide support member 36 includes a flange portion 36a that is connected to the side bracket 3. In the second embodiment, the inner cylinder 12 and the slide support member 36 serve as the displacement members.

The friction members 24 fitted to bore portions formed at a cylindrical portion of the slide support member 36, the spring bodies 25 generating the biasing force relative to the friction members 24 so that the friction members 24 are in pressure-contact with the outer peripheral surface of the inner cylinder 12 to generate the friction force, and the retaining rings 26 that inhibit the spring bodies 25 from disengaging constitute a portion of the operation damping mechanism Bc.

The vehicle body reinforcement unit B also includes a vibration absorption member 37 made of rubber or sponge, for example, and disposed at each of inner voids of the outer cylinder 11 and the inner cylinder 12 for restraining vibration.

In the aforementioned configuration, the fitting protruding portion 28a of the support plug 28 is inserted to be positioned within a fitting bore formed at the center bracket 4 in a state where the threaded surface of the first engagement rod 15 of the fixation holder 14 is threadedly engaged with the threaded portion of the engagement bore 28c of the support plug 28. Then, a fixation nut 28d is threadedly engaged with the threaded surface of the fitting protruding portion 28a. As a result, one end side of the reinforcement member Ba is fixed to the center bracket 4. In the aforementioned state, a falling prevention nut 15a is threadedly engaged with the threaded surface of the first engagement rod 15 to thereby obtain secure fixation.

While one end side of the reinforcement member Ba is being fixed, the screw shaft 32 is inserted to a penetration bore formed at the plate portion 3a of the side bracket 3 in a state where the slide support member 36 is externally fitted to the outer end portion of the inner cylinder 12 so that the displacement restraining springs 22 are positioned to sandwich the plate portion 3a of the side bracket 3. Then, the flat washer 33 is disposed at an outer end portion (i.e., a left end portion in FIG. 4) of the screw shaft 32 so that the plural nuts 34 are fixed. In addition, because of the operation (fixation) of the plural nuts 34, loads of the displacement restraining springs 22 positioned to sandwich the plate portion 3a may be adjusted simultaneously and equally. In the aforementioned configuration, the relative rotation between the outer cylinder 11 and the inner cylinder 12 constitutes the screw-type length adjusting portion L for adjusting the length of the reinforcement member Ba.

The flange portion 36a of the slide support member 36 is fixed to the plate portion 3a of the side bracket 3 by fixation bolts 38 so as to fix the side bracket 3 to the corresponding side member 1. Consequently, mounting of the vehicle body reinforcement unit B to the vehicle body A is completed.

In mounting the vehicle body reinforcement unit B to the vehicle body A, the attaching position of the side bracket 3 to the corresponding side member 1 may be changed to reduce a relative rotation amount between the outer cylinder 11 and the inner cylinder 12.

In the second embodiment, in the same way as the first embodiment, a tool such as a wrench or a spanner, for example, is placed at the first operation surfaces 11b of the outer cylinder 11 and the second operation surfaces 12b of the inner cylinder 12 to achieve the relative rotation of the outer cylinder 11 and the inner cylinder 12. In addition, the lock nut 13 is rotated by a tool such as a wrench or a spanner, for example. After the outer cylinder 11 and the inner cylinder 12 are locked to each other by the lock nut 13, the opposed ends of the bellows 27 are fixed to the slide support member 36 and the outer cylinder 11 as illustrated in FIG. 4.

In the vehicle body reinforcement unit B of the second embodiment, in a case where an external force is applied to the vehicle body reinforcement unit B in either the contracting direction or the expanding direction (i.e., separating direction) along the main axis X, either the displacement restraining springs 22 serving as the first biasing member, or the displacement restraining springs 22 serving as the second biasing member of the displacement restraining mechanisms Bb are compressed. Thus, the biasing force of the displacement restraining springs 22 generated in association with the aforementioned compression is applied in the direction against the displacement of the reinforcement member Ba to restrain the displacement.

In addition, in a case where an external force is applied to the vehicle body reinforcement unit B in either the contracting direction or the expanding direction along the main axis X, the friction members 24 of the operation damping mechanism Bc are in press-contact with the outer periphery of the inner cylinder 12 when the inner cylinder 12 and the slide support member 36 are displaced relative to each other. Thus, the relative movement between the inner cylinder 12 and the slide support member 36 is damped by the damping force generated by the friction members 24 of the operation damping mechanism Bc. A rapid displacement of the inner cylinder 12 and the slide support member 36 is restrained and amplitude of vibration is reduced in a case where vibration is generated upon the displacement.

Specifically, because of the vibration absorption members 37 assembled at the inner portion of the reinforcement member Ba, vibration of the reinforcement member Ba generated in a direction orthogonal to the main axis X may be restrained.

The vehicle body reinforcement unit B of the second embodiment may be applied not only in the second mounting state but also in the first mounting state.

The vehicle body reinforcement unit B is not limited to include the configurations of the first embodiment and the second embodiment and may include configurations according to the following embodiments. In addition, in the following embodiments, the vehicle body reinforcement unit B may be mounted to the vehicle body A in a mounting state other than the first mounting state or the second mounting state.

Figure 5:
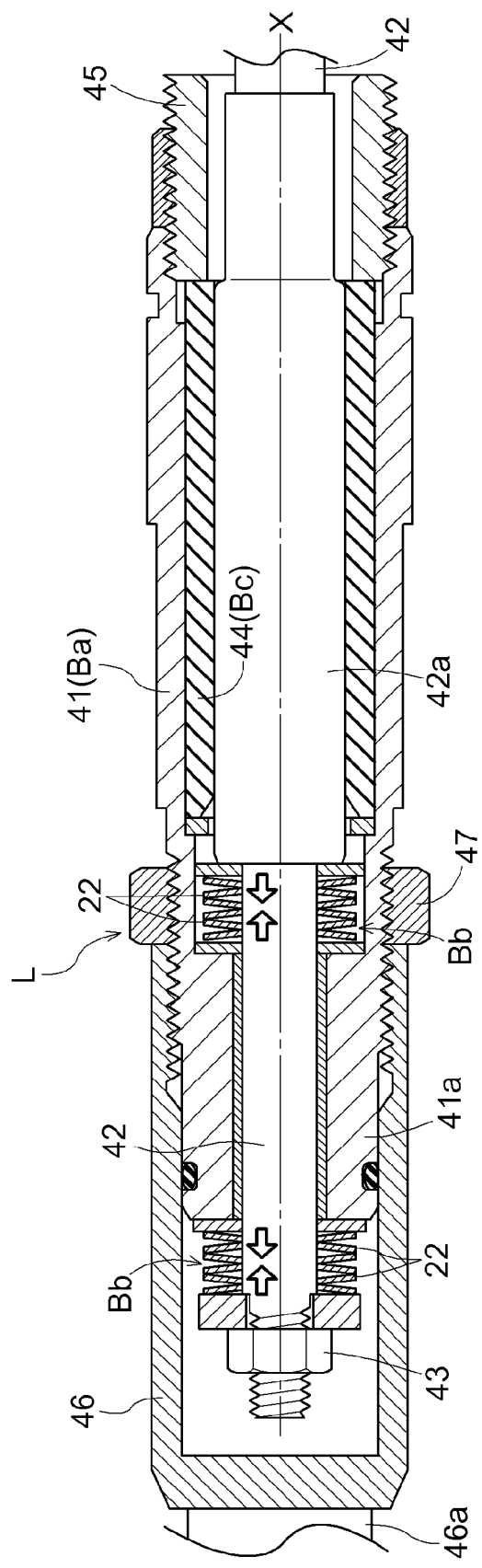
FIG. 5 is a cross-sectional view of the vehicle body reinforcement unit according to a third embodiment disclosed here.

In a third embodiment, as illustrated in FIG. 5, the reinforcement member Ba includes a main cylindrical body 41 (cylindrical body) within which a shaft body 42 is disposed, the shaft body 42 being coaxial with the main axis X. The shaft body 42 in a shaft form coaxial with the main axis X includes a large diameter portion 42a at a center. The plural displacement restraining springs 22 serving as the biasing member are disposed so as to sandwich a thick portion 41a of the main cylindrical body 41 formed at an end portion. The shaft body 42 is arranged to penetrate through the displacement restraining springs 22. An adjustment nut 43 is threadedly engaged with a threaded portion formed at an end portion of the shaft body 42. As a result, two of the displacement restraining mechanisms Bb are constituted. In the third embodiment, the main cylindrical body 41 and the shaft body 42 serve as the displacement members.

In a case where the main cylindrical body 41 and the shaft body 42 are displaced in the expanding direction along the main axis X, the outer plural displacement restraining springs 22 provided at the outer side (i.e., the left side in FIG. 5) are compressed by a pressure from the adjustment nut 43. On the other hand, in a case where the main cylindrical body 41 and the shaft body 42 are displaced in the contracting direction along the main axis X, the inner plural displacement restraining springs 22 provided at the inner side (i.e., the right side in FIG. 5) are compressed by a pressure from the large diameter portion 42a of the shaft body 42.

In the displacement restraining mechanisms Bb, a compression amount of each of the outer displacement restraining springs 22 at the outer side, and a compression amount of each of the inner displacement restraining springs 22 at the inner side, may be adjusted simultaneously to adjust strength of force against the displacement.

A damping cylindrical body 44 is disposed between an inner surface (inner periphery) of the main cylindrical body 41 in a cylindrical form and an outer surface (outer periphery) of the shaft body 42 in a shaft form. Specifically, the damping cylindrical body 44 in a cylindrical form that is flexibly deformable and flexible is in press-contact with the inner surface of the main cylindrical body 41 and the outer surface of the shaft body 42. A holding member 45 for positioning the damping cylindrical body 44 is threadedly engaged with an end portion of the main cylindrical body 41. The operation damping mechanism Bc is thus constituted.

In the operation damping mechanism Bc, in a case where the main cylindrical body 41 and the shaft body 42 are displaced relative to each other in either the contracting direction or the expanding direction along the main axis X, the relative movement between the main cylindrical body 41 and the shaft body 42 may be damped by a viscoelastic force generated upon compression of the damping cylindrical body 44 along the main axis X.

A bracket cylinder 46 is threadedly engaged with a threaded portion formed at an outer periphery of the main cylindrical body 41 at a side facing the displacement restraining mechanism Bb. The main cylindrical body 41 is fixed by a bracket nut 47 that is threadedly engaged with the threaded portion of the main cylindrical body 41. The bracket cylinder 46 includes a connection plate 46*a*. In the third embodiment, the relative rotation of the bracket cylinder 46 relative to the main cylindrical body 41 constitutes the screw-type length adjusting portion L for adjusting the length of the reinforcement member Ba.

As mentioned above, the vehicle body reinforcement unit B may be mounted to the vehicle body A in either the first mounting state or the second mounting state. For example, in a case where the vehicle body reinforcement unit B is mounted in the first mounting state, the connection plate 46*a* is connected to one of the side members 1 and an outer end portion (i.e., a right end portion in FIG. 5) of the shaft body 42 is connected to the other of the side members 1.

In the vehicle body reinforcement unit B of the third embodiment, in a case where an external force is applied to the vehicle body reinforcement unit B in either the contracting direction or the expanding direction along the main axis X, the displacement restraining springs 22 of one of the displacement restraining mechanisms Bb are compressed. Thus, the biasing force of the displacement restraining springs 22 generated in association with the aforementioned compression is applied in the direction against the displacement of the main cylindrical body 41 and the shaft body 42 (the reinforcement member Ba) to restrain the displacement.

In addition, in a case where an external force is applied to the vehicle body reinforcement unit B in either the contracting direction or the expanding direction along the main axis X, the damping cylindrical body 44 of the operation damping mechanism Bc damps the relative movement between the main cylindrical body 41 and the shaft body 42 by the viscoelastic force upon relative displacement of the main cylindrical body 41 and the shaft body 42.

Figure 6:
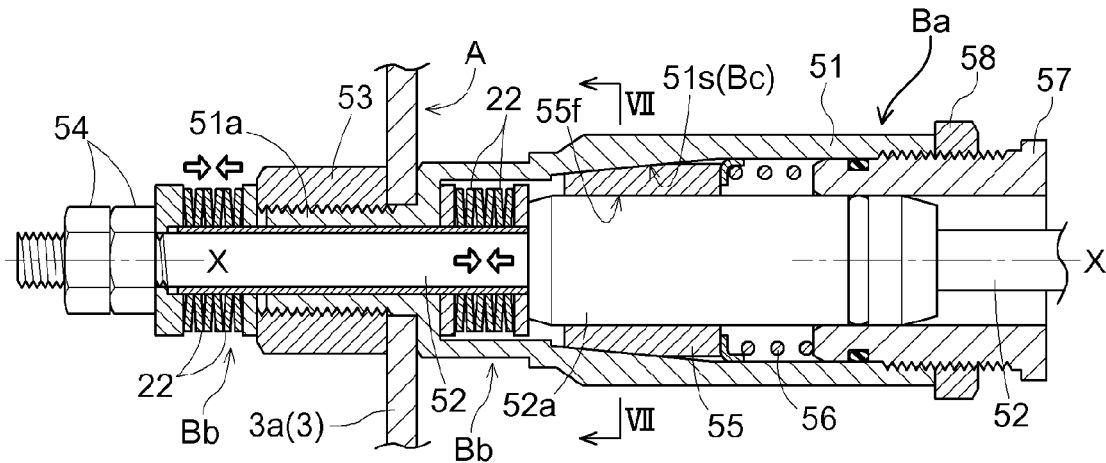
FIG. 6 is a cross-sectional view of the vehicle body reinforcement unit according to a fourth embodiment disclosed here.

In a fourth embodiment, as illustrated in FIG. 6, the reinforcement member Ba includes a main case 51 serving as a cylindrical case in a cylinder form and a shaft portion 52 in a rod form coaxial with the main axis X. The shaft portion 52 is disposed within the main case 51 so as to be coaxial with the main axis X. In a case where the reinforcement member Ba is mounted in the second mounting state to the vehicle body A, a cylindrical portion 51*a* formed at an end portion of the main case 51 is inserted to be positioned within a through hole formed at the plate portion 3*a* of the side bracket 3. A connection nut 53 is then threadedly engaged with a threaded portion formed at an outer surface of the cylindrical portion 51*a* to thereby fix the main case 51 to the side bracket 3.

The shaft portion 52 includes a large diameter section 52*a* at a center in the direction of the main axis X. One end of the shaft portion 52 penetrates through the cylindrical portion 51*a* of the main case 51. The plural displacement restraining springs 22 serving as the biasing member are disposed within the main case 51 to be positioned at an inner end side of the cylindrical portion 51*a* (i.e., a right end side of the cylindrical portion 51*a* in FIG. 6). In addition, another plural displacement restraining springs 22 serving as the biasing member are disposed at the outer side than an outer end side of the cylindrical portion 51*a* (i.e., a left end side of the cylindrical portion 51*a* in FIG. 6) so as to be externally fitted to the shaft portion 52. Plural pressure-regulating nuts 54 are threadedly engaged with an outer end of the shaft portion 52 (i.e., a left end of the shaft portion 52 in FIG. 6) to obtain two of the displacement restraining mechanisms Bb. In the fourth embodiment, the main case 51 and the shaft portion 52 serve as the displacement members.

In a case where the main case 51 and the shaft portion 52 are displaced in the expanding direction along the main axis X, the outer plural displacement restraining springs 22 provided at the outer side (i.e., the left side in FIG. 6) of the main case 51 (the cylindrical portion 51*a*) are compressed by a pressure from the connection nut 53. On the other hand, in a case where the main case 51 and the shaft portion 52 are displaced in the contracting direction along the main axis X, the inner plural displacement restraining springs 22 provided at the inner side (i.e., the right side in FIG. 6) of the cylindrical portion 51*a* are compressed by a pressure from the large diameter section 52*a* of the shaft portion 52.

The inner surface of the main case 51 forms or includes a tapered inner surface 51*s* serving as a friction surface. The diameter of the tapered inner surface 51*s* decreases in a direction towards the displacement restraining springs 22. A chuck member 55 including an outer peripheral surface in a tapered form is externally fitted to the large diameter section 52*a* of the shaft portion 52. The tapered inner surface 51*s* of the main case 51 is in contact with the outer peripheral surface of the chuck member 55. In addition, a compression coil spring 56 serving as a biasing mechanism is provided to generate a biasing force in a direction where the outer peripheral surface of the chuck member 55 is in press-contact with the tapered inner surface 51*s*. An adjustment ring 57 is threadedly engaged with an end portion of the main case 51 for adjusting the biasing force of the compression coil spring 56. A holding nut 58 is threadedly engaged with an outer periphery of the adjustment ring 57 for securing the adjustment ring 57.

The operation damping mechanism Bc, which includes the tapered inner surface 51*s*, the chuck member 55, the shaft portion 52, and the compression coil spring 56, is configured by a function portion for applying the damping force to the relative displacement of the main case 51 and the shaft portion 52 along the main axis X.

Figure 7:
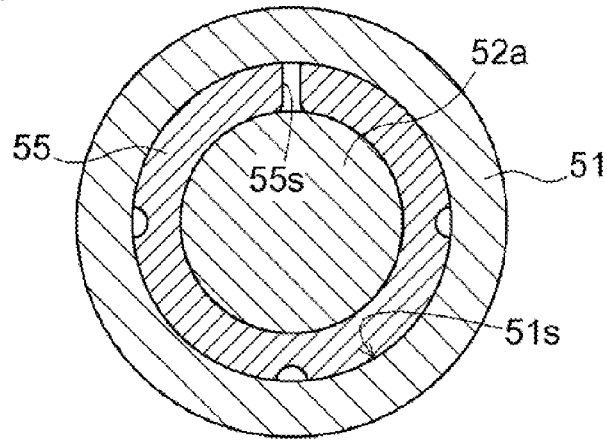
FIG. 7 is a cross-sectional view taken along line VII-VII in FIG. 6.

As illustrated in FIG. 7, the chuck member 55 includes a slit 55*s* along the main axis X so that the outer diameter of the chuck member 55 is changeable by the biasing force applied from the compression coil spring 56. In addition, the vehicle body reinforcement unit B is configured so that an extension end of the shaft portion 52 is connected to the cross member 2 or the center bracket 4, for example.

In the vehicle body reinforcement unit B of the fourth embodiment, in a case where an external force is applied to the vehicle body reinforcement unit B in either the contracting direction or the expanding direction along the main axis X, the displacement restraining springs 22 of one of the displacement restraining mechanisms Bb are compressed. Thus, the biasing force of the displacement restraining springs 22 generated in association with the aforementioned compression is applied in the direction against the displacement of the main case 51 and the shaft portion 52 (the reinforcement member Ba) to restrain the displacement.

In addition, in a case where an external force is applied to the vehicle body reinforcement unit B in either the contracting direction or the expanding direction along the main axis X, the chuck member 55 is pressed against the tapered inner surface 51*s* of the main case 51 by the compression coil spring 56 in association with the displacement of the shaft portion 52, which results in a contact surface pressure between an outer diameter surface of the large diameter section 52a and an inner diameter surface 55f of the chuck member 55. As a result, friction damping is applied to the relative movement between the main case 51 and the shaft portion 52. A rapid displacement of the reinforcement member Ba is restrained and amplitude of vibration is reduced in a case where vibration is generated upon the displacement. The aforementioned damping force is changeable by the adjustment of the biasing force applied to the chuck member 55 from the compression coil spring 56 by the operation of the adjustment ring 57.

Figure 8:
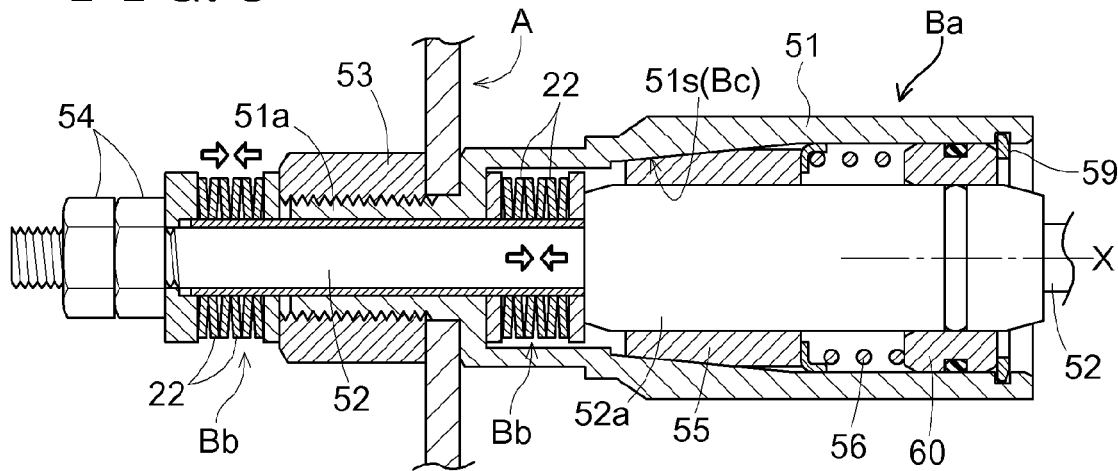
FIG. 8 is a cross-sectional view of the vehicle body reinforcement unit according to a fifth embodiment disclosed here.

A fifth embodiment is different from the fourth embodiment in configuration of the vehicle body reinforcement unit B where a spring bearing member 60 is provided instead of the adjustment ring 57, the spring bearing member 60 being secured by a retaining spring (i.e., a snap ring) 59, as illustrated in FIG. 8.

According to the aforementioned configuration, the substantially similar operation to the fourth embodiment is obtained in the fifth embodiment. Specifically, in the fifth embodiment, the damping force applied from the operation damping mechanism Bc is constant. Nevertheless, the configuration of the vehicle body reinforcement unit B is simplified without the adjustment ring 57, which leads to a cost reduction.

Figure 9:
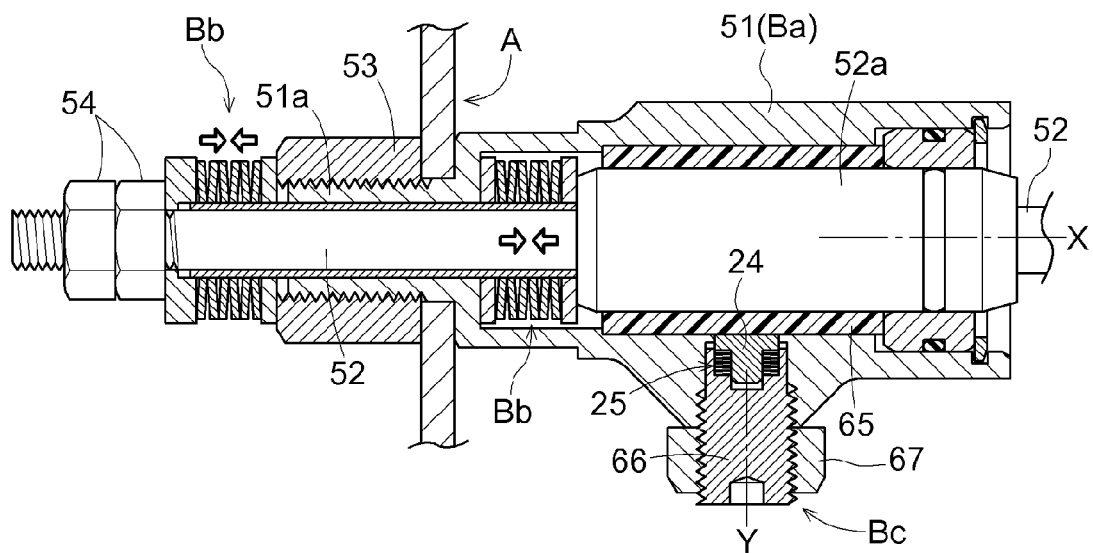
FIG. 9 is a cross-sectional view of the vehicle body reinforcement unit according to a sixth embodiment disclosed here.

A sixth embodiment differs from the fourth embodiment in configuration of the operation damping mechanism Bc of the vehicle body reinforcement unit B. As illustrated in FIG. 9, a collar member 65 made of resin and including a cylindrical form is provided. The collar member 65 is displaced integrally with the large diameter section 52a of the shaft portion 52 along the main axis X. In addition, the friction member 24 that is fitted to a bore portion formed at a cylindrical portion of the main case 51 and being coaxial with the orthogonal axis Y orthogonal to the main axis X, the spring body 25 formed by a disc spring to generate a biasing force for bringing the friction member 24 to make press-contact with an outer peripheral surface of the collar member 65, an adjustment bolt 66, and an adjustment maintaining nut 67 are provided at a cylindrically formed portion of the main case 51. The adjustment bolt 66 is threadedly engaged with the cylindrically formed portion of the main case 51 for adjusting the biasing force of the spring body 25. The adjustment maintaining nut 67 maintains an adjusted state of the adjustment bolt 66 by threadedly engaging with a threaded portion formed at an outer periphery of the adjustment bolt 66. The collar member 65, the friction member 24, the spring body 25, the adjustment bolt 66, and the adjustment maintaining nut 67 constitute a portion of the operation damping mechanism Bc.

The operation damping mechanism Bc of the sixth embodiment differs in configuration of the operation damping mechanism Bc from the first embodiment and the second embodiment. Specifically, the operation damping mechanism Bc of the sixth embodiment is configured so that the damping force applied between the collar member 65 and the large diameter section 52a of the shaft portion 52 is adjustable by the adjustment of biasing force applied from the spring body 25 to the friction member 24 which is achieved by the operation of the adjustment bolt 66. In addition, according to the operation damping mechanism Bc of the sixth embodiment, the damping force is adjustable by removing the adjustment bolt 66 and changing the number of disc springs that constitute the spring body 25. Further, changing the collar member 65 to include a different friction coefficient may also obtain the necessary damping force.

According to the sixth embodiment, the displacement restraining mechanism Bb functions in the same way as the fourth embodiment. The operation damping mechanism Bc functions in the same way as the first embodiment.

Figure 10:
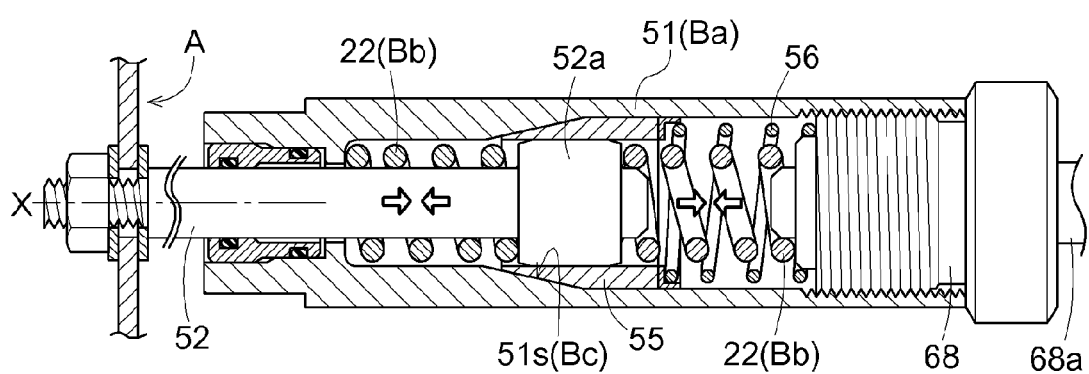
FIG. 10 is a cross-sectional view of the vehicle body reinforcement unit according to a seventh embodiment disclosed here.

A seventh embodiment includes a configuration partially similar to the configuration of the fourth embodiment. As illustrated in FIG. 10, the shaft portion 52 is accommodated at the inner portion of the main case 51 to be coaxial with the main axis X in a state where the shaft portion 52 is movable relative to the main case 51 along the main axis X. The chuck member 55 is provided at the large diameter section 52a of the shaft portion 52 so that the outer peripheral surface of the chuck member 55 is in contact with the tapered inner surface 51s of the main case 51.

In addition, in the seventh embodiment, the displacement restraining springs 22 each of which is formed by a compression coil spring serving as the biasing member are provided and positioned so as to sandwich the large diameter section 52a of the shaft portion 52 in the direction along the main axis X. One end of the shaft portion 52 projects outwardly from the main case 51 so that the extension end of the shaft portion 52 is connected to one of the side members 1 or the side bracket 3 by a nut, for example.

Further, an intermediate support body 68 is threadedly engaged and connected to the main case 51. The intermediate support body 68 includes a function as a spring bearing for one of the displacement restraining springs 22 disposed at an open side of the main case 51 and a function as a spring bearing for the compression coil spring 56 that applies the biasing force to the chuck member 55. A rod portion 68a is formed to project at an outer surface side (i.e., a right surface side in FIG. 10) of the intermediate support body 68. The rod portion 68a is connected to the other of the side members 1 or the center bracket 4, for example.

In the seventh embodiment, because each of the displacement restraining springs 22 is formed by the compression coil spring, the displacement restraining spring 22 may operate at a large operation stroke. The biasing force of the pair of displacement restraining springs 22, and the biasing force applied from the compression coil spring 56 to the chuck member 55 are simultaneously adjustable by the adjustment of threaded engagement depth of the intermediate support body 68 relative to the main case 51 along the main axis X.

Figure 11:
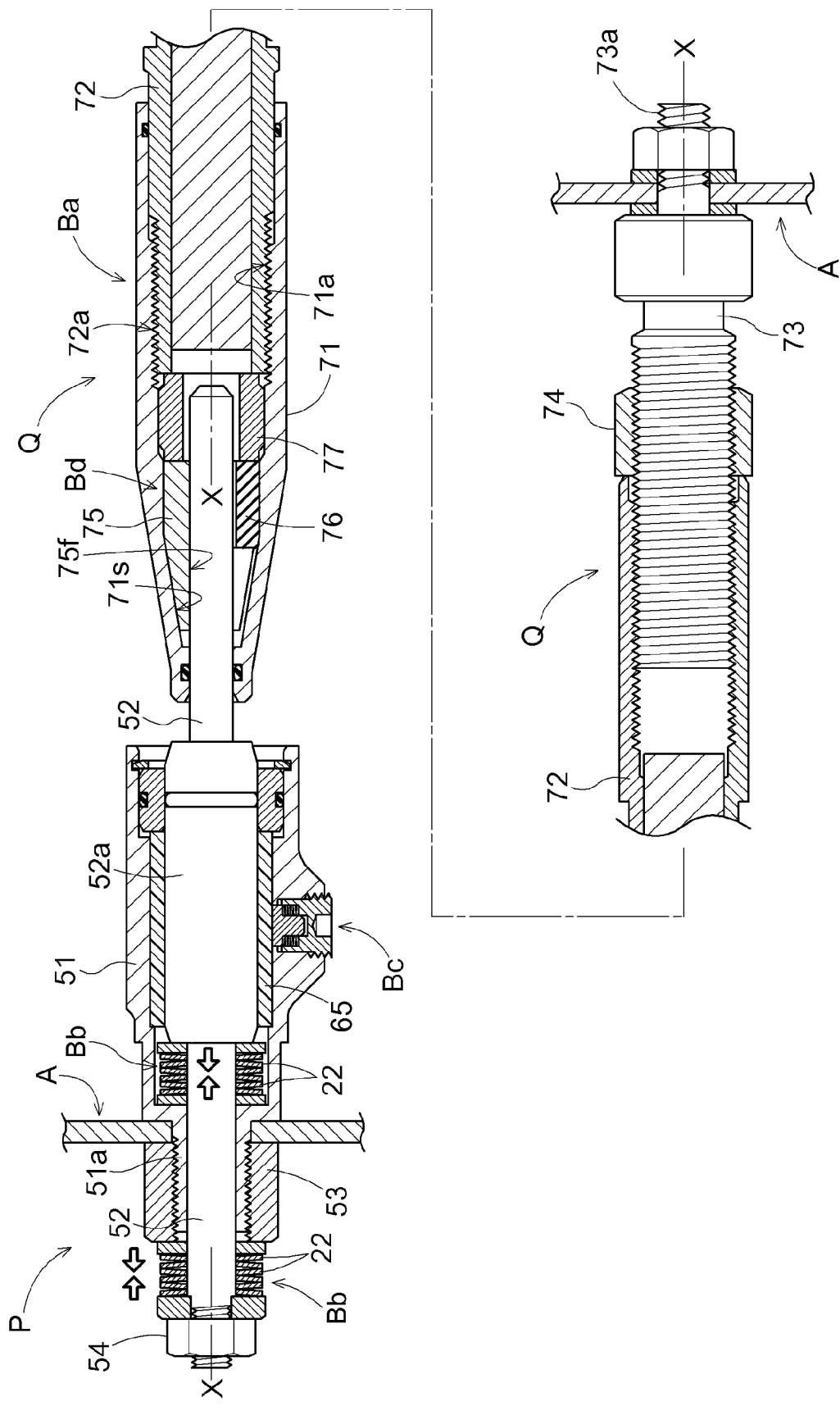
FIG. 11 is a cross-sectional view of the vehicle body reinforcement unit according to an eighth embodiment disclosed here.

An eighth embodiment is configured to include a biasing force release portion Bd for releasing the biasing force applied from the displacement restraining mechanism Bb in addition to the substantially common configuration to the sixth embodiment. As illustrated in FIG. 11, a sub unit Q serving as an example of a first displacement member and including the biasing force release portion Bd is arranged to be connected to the extension end of the shaft portion 52 that is included in a main unit P serving as an example of a second displacement member.

The main unit P includes the common configuration to the vehicle body reinforcement unit B of the sixth embodiment. The sub unit Q includes a first reinforcement body 71, a second reinforcement body 72, and a third reinforcement body 73 arranged to face one another along the main axis X. In the eighth embodiment, the main unit P and the sub unit Q constitute the vehicle body reinforcement unit B. Specifically, the first reinforcement body 71, the second reinforcement body 72, and the third reinforcement body 73 constitute the reinforcement member Ba.

The first reinforcement body 71 is formed in a cylindrical form including one end that is tapered (i.e., tapered end side) and the other end that is opened (i.e., open end side). An internal thread portion 71a is formed at an inner periphery of the cylindrical form of the first reinforcement body 71. The second reinforcement body 72 includes an external thread portion 72a at one end with which the internal thread portion 71a is threadedly engaged so that the first reinforcement body 71 and the second reinforcement body 72 threadedly engage with each other.

The second reinforcement body 72 is formed in a cylindrical form including an internal thread portion at an inner periphery at the other end with which an external thread portion formed at an outer periphery of the third reinforcement body 73 is threadedly engaged. An adjustment fixation nut 74 is provided to threadedly engage with the external thread portion of the third reinforcement body 73. A rod 73a is formed to project at an outer end of the third reinforcement body 73 so as to be connected to the side member 1, for example. In the aforementioned configuration, the second reinforcement body 72 and the third reinforcement body 73 are relatively rotated to each other with reference to the main axis X to thereby adjust the length of the second reinforcement body 72 and the third reinforcement body 73. The thus adjusted length may be fixed by the adjustment fixation nut 74.

In addition, the relative rotation between the first reinforcement body 71 and the second reinforcement body 72 with reference to the main axis X causes the relative displacement of the first reinforcement body 71 and the second reinforcement body 72 along the main axis X. Accordingly, a state where clamp members 75 provided at an inside of the first reinforcement body 71 are connected to the shaft portion 52 (i.e., connected state) and a state where the connection of the clamp members 75 and the shaft portion 52 is released (i.e., disconnected state) are obtained. Switching between the aforementioned connected state and disconnected state is achieved by the biasing force release portion Bd that releases the biasing force applied from the displacement restraining mechanism Bb.

Figure 12:
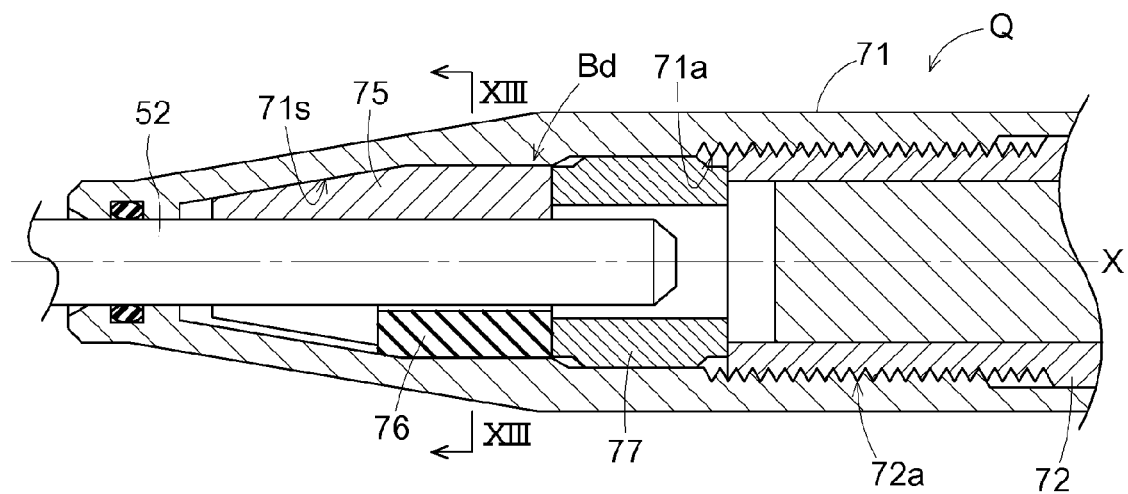
FIG. 12 is a cross-sectional view illustrating arrangements of a clamp member and an intermediate member according to the eighth embodiment.
Figure 13:
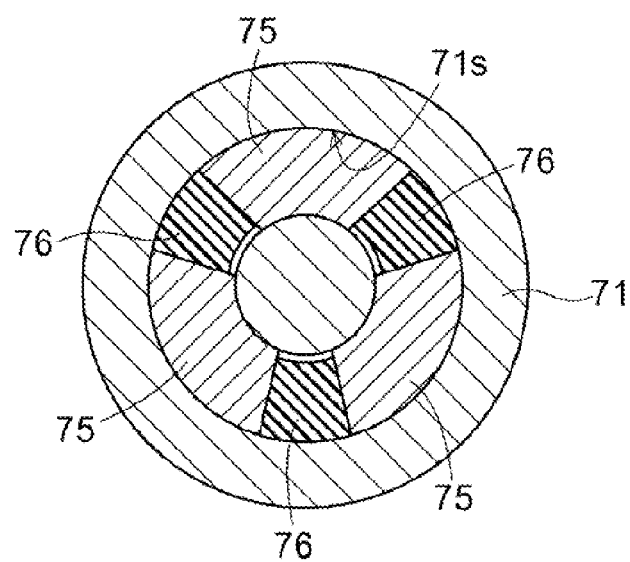
FIG. 13 is a cross-sectional view taken along line XIII-XIII in FIG. 12.

As illustrated in FIGS. 11 to 13, a friction surface 71s serving as a tapered inner surface and decreasing in diameter towards an outer end of the first reinforcement body 71 is formed at an inner periphery at the tapered end side of the first reinforcement body 71. A friction surface 75f is formed at an inner surface of the clamp member 75. The plural clamp members 75 each of which includes an inclined surface in contact with the friction surface 71s, plural intermediate members 76 each of which is made of flexible material including rubber or resin, for example, and which is interposed between the adjacent clamp members 75 in a circumferential direction, and a spacer 77 in a ring form in contact with the plural clamp members 75 are provided at the inner portion of the first reinforcement body 71. The plural clamp members 75, the plural intermediate members 76, and the space 77 function as the biasing force release portion Bd.

According to the vehicle body reinforcement unit B of the eighth embodiment, each of the displacement restraining mechanisms Bb of the main unit P applies the biasing force in a direction against the displacement of the first reinforcement body 71 and the second reinforcement body 72. The operation damping mechanism Bc achieves the function to damp the relative movement between the first reinforcement body 71 and the second reinforcement body 72.

In a case where the first reinforcement body 71 and the second reinforcement body 72 are rotated relative to each other with reference to the main axis X so as to operate in a direction approaching each other (i.e., in the contracting direction along the main axis X) by the function of the internal thread portion 71a and the external thread portion 72a, the end portion of the second reinforcement body 72 makes contact with the spacer 77 to thereby bring the plural clamp members 75 to make contact with the friction surface 71s of the first reinforcement body 71. In the aforementioned contact state between the clamp members 75 with the friction surface 71s, the plural friction surfaces 75f of the plural clamp members 75 are in press-contact with the outer periphery of the shaft portion 52. Thus, the first reinforcement body 71, the clamp members 75, and the shaft portion 52 are united so that displacement force at the reinforcement member Ba is transmitted to the displacement restraining mechanisms Bb of the main unit P to thereby generate a force against the displacement.

On the other hand, in a case where the first reinforcement body 71 and the second reinforcement body 72 are rotated relative to each other with reference to the main axis X so as to operate in a direction separating from each other (i.e., in the expanding direction along the main axis X) by the function of the internal thread portion 71a and the external thread portion 72a, a pressing force applied from the spacer 77 to the plural clamp member 75 is released. In such state, the plural clamp members 75 are separated from the outer periphery of the shaft portion 52 by an elastic force (a reaction force) from the intermediate members 76. Thus, the first reinforcement body 71 is separated from the shaft portion 52, which inhibits the displacement force at the reinforcement member Ba from being transmitted to the displacement restraining mechanisms Bb.

Accordingly, in the eighth embodiment, a state where the displacement force applied from the side member 1, for example, is transmitted to the displacement restraining mechanisms Bb to be restrained appropriately and to be damped appropriately by the operation damping mechanism Bc is obtained. In addition, a state where the biasing force release portion Bd is inhibited from transmitting the displacement force to the displacement restraining mechanisms Bb is obtainable.

Figure 14:
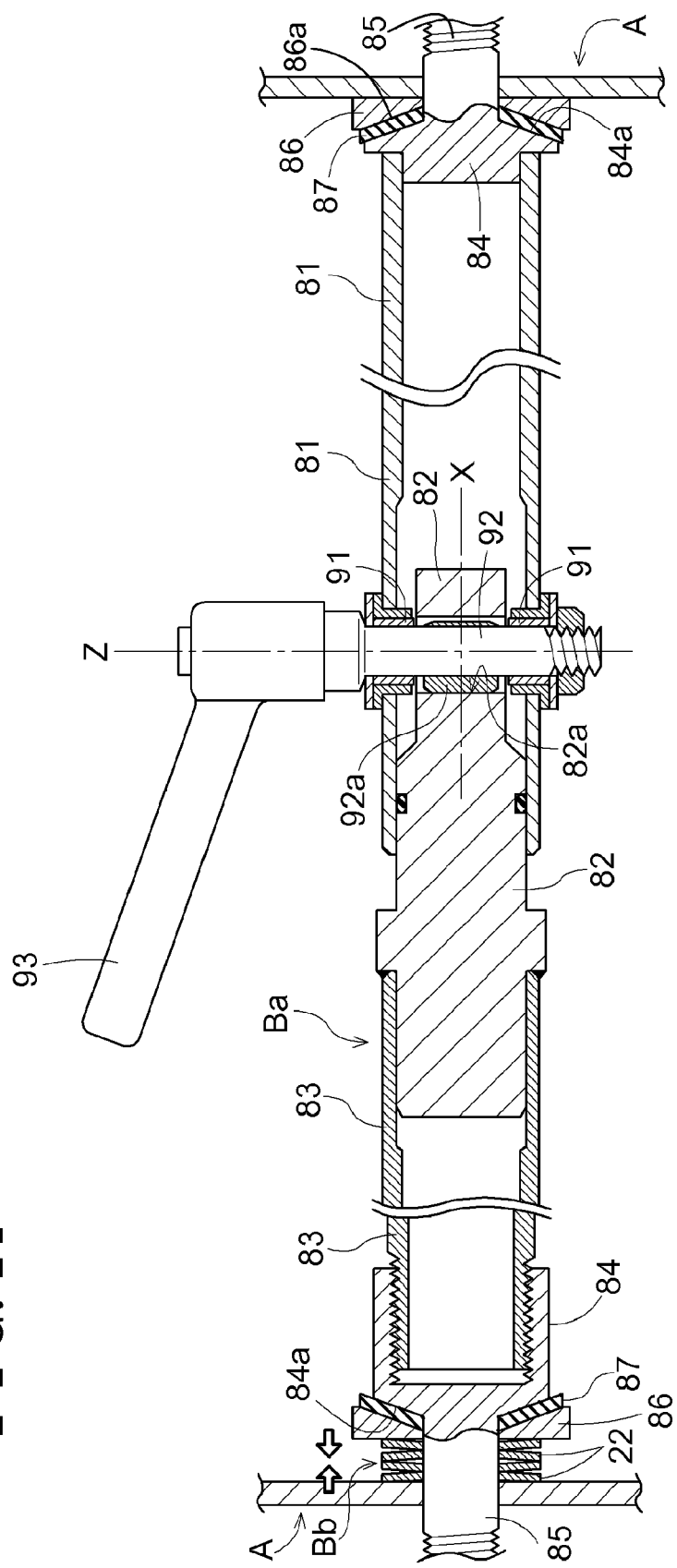
FIG. 14 is a cross-sectional view of the vehicle body reinforcement unit according to a ninth embodiment disclosed here.

A ninth embodiment includes a modified example of the biasing force release portion Bd explained in the eighth embodiment. As illustrated in FIG. 14, the reinforcement member Ba includes a first member 81 in a cylindrical form serving as an example of the first displacement member, a second member 82 in a bar form serving as an example of the second displacement member, and a third member 83 in a cylindrical form. The first member 81, the second member 82, and the third member 83 are arranged along the main axis X.

End portion holders 84 are provided at respective outer ends of the first member 81 and the third member 83. End portion shafts 85 provided to project at the respective end portion holders 84 are inserted to be positioned within bores formed at the corresponding side members 1 or brackets, for example. Each of the end portion holders 84 includes an end portion contact surface 84a serving as a rotating inclined surface that decreases in diameter towards the corresponding outer end of the first member 81 or the third member 83.

Support plates 86 each of which includes an opening portion into which the end portion shaft 85 is insertable are disposed at the bores formed at the corresponding side members 1 or the brackets, for example. Each of the support plates 86 includes a guide surface 86a to which the end portion contact surface 84a of the end portion holder 84 is fitted. A buffer plate 87 made of flexible resin such as polyurethane rubber sheet, for example, is disposed between the guide surface 86a and the end portion contact surface 84a.

Specifically, the plural displacement restraining springs 22 formed by the disc springs serving as the biasing member are disposed between the third member 83 and the frame portion such as the side member 1, for example, to thereby constitute the displacement restraining mechanism Bb.

One end portion of the second member 82 is internally fitted to the third member 83 so that the second member 82 and the third member 83 are fixed by welding. In addition, the other end portion of the second member 82 is inserted to the first member 81 so as to be movable in a reciprocating manner along the main axis X. A bore portion is formed at the first member 81 to be coaxial with a cam axis Z that passes through the aforementioned insertion portion of the second member 82 and that is orthogonal to the main axis X. A camshaft 92 is supported at the bore portion via a bush 91 so as to be rotatable. A handle 93 is provided at an outer end of the camshaft 92.

A cam portion 92a including a cross section in an elliptical shape, for example, is formed at a substantially intermediate portion of the camshaft 92. The second member 82 includes a cam surface 82a in a bore form into which the camshaft 92 is inserted. Accordingly, in a case where the handle 93 is operated to rotate the camshaft 92, the camshaft 92 rotates relative to the cam axis Z to change a contact state between the cam portion 92a and the cam surface 82a. The displacement of the second member 82 relative to the first member 81 along the main axis X is achieved.

In the vehicle body reinforcement unit B of the ninth embodiment, the displacement restraining mechanism Bb applies the biasing force in a direction against the displacement in the contracting direction, which is the same as the first embodiment.

Figure 15:
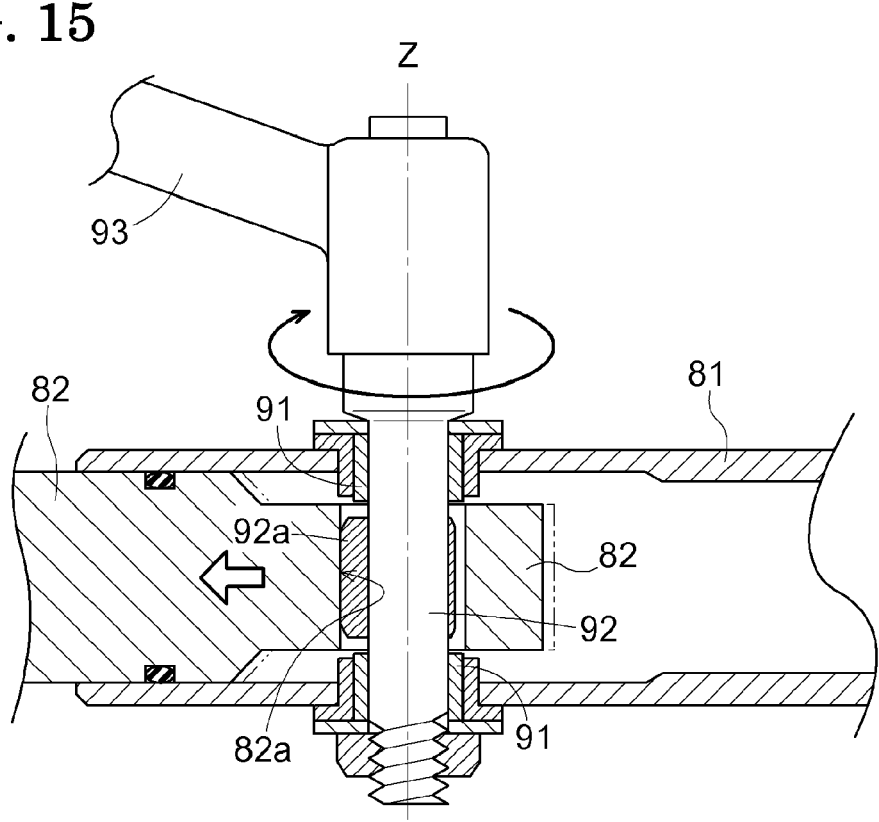
FIG. 15 is a cross-sectional view of a cam portion and other members in an expanding state according to the ninth embodiment.

In addition, in a state where the vehicle body reinforcement unit B is supported at the right and left side members 1 or the brackets, for example, the handle 93 is operated to rotate so that the first member 81 and the third member 83 are operated in the expanding direction along the main axis X. In a case where the handle 93 is operated in the aforementioned manner, as illustrated in FIG. 15, the displacement restraining springs 22 of the displacement restraining mechanism Bb are disposed and sandwiched between the side member 1 or the bracket, for example, and the support plate 86. Accordingly, in a case where an external force is applied in a direction to contract the reinforcement member Ba (i.e., in the contracting direction), the displacement restraining springs 22 generate a force against the displacement.

Figure 16:
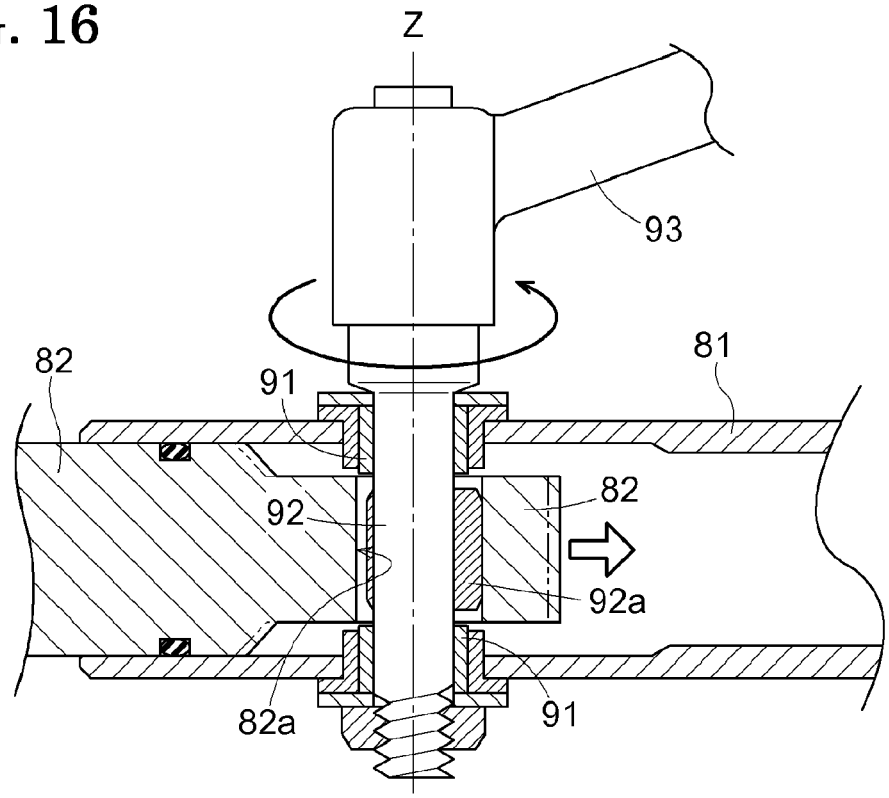
FIG. 16 is a cross-sectional view of the cam portion and other members in a contracting state according to the ninth embodiment.

On the other hand, the handle 93 may be operated to rotate so that the first member 81 and the third member 83 are operated in the contracting direction along the main axis X. In a case where the handle 93 is operated in the aforementioned manner, as illustrated in FIG. 16, the displacement restraining springs 22 of the displacement restraining mechanism Bb are inhibited from generating the biasing force. Accordingly, even in a case where an external force is applied in the contracting direction where the reinforcement member Ba is contracted, the displacement restraining mechanism Bb is inhibited from functioning.

Specifically, in the ninth embodiment, the buffer plate 87 disposed between the end portion holder 84 and the support plate 86 is elastically deformable. Thus, vibration caused by a load fluctuation, for example, is damped to thereby improve ride quality.

The aforementioned embodiments may be modified or changed as follows.

In a state where the outer surface of one of the displacement members serves as a friction surface relative to the friction member 24, the other of the displacement members may include the friction member 24 in the operation damping mechanism Bc that includes the friction member 24. As compared to the configuration illustrated in FIG. 3, the inner periphery of the slide holder 21 may serves as the friction surface, and the inner cylinder 12 may include the friction member 24 and the spring body 25 (biasing body). In such case, a polymeric film or a resin film, for example, may be formed at the friction surface. In addition, in the vehicle body reinforcement unit B of the first embodiment, the first engagement rod 15 and the second engagement rod 23 are connected to the right and left side members 1, for example. Alternatively, opposed ends of the vehicle body reinforcement unit B may be connected and fixed to the side members 1 by means of a screw, riveting, welding, or adhesion, for example.

Further, the reinforcement member Ba may be formed to include, as the pair of displacement members, a large diameter cylinder body and a small diameter cylinder body that is internally fitted to the large diameter cylinder body in a state where the large diameter cylinder body and the small diameter cylinder body are slidable to each other. Then, the operation damping mechanism Bc may be configured to obtain a damping force by the slidable contact between an inner periphery of the large diameter cylinder body and an outer periphery of the smaller diameter cylinder body at an appropriate friction. In a case where the operation damping mechanism Bc is configured in the aforementioned manner, sliding surfaces at which friction is generated may be coated with resin or a pressure-contact state may be positively obtained at the sliding surfaces by means of a spring plate, for example.

Furthermore, the vehicle body reinforcement unit B in the first and second embodiments as illustrated in FIGS. 3 and 4 may be configured without the operation damping mechanism Bc of the vehicle body reinforcement unit B.

The aforementioned embodiments may be applied to a reinforcement member disposed between a pair of frame portions of a vehicle body.

According to the aforementioned first to ninth embodiments, in a case where the relative distance between the pair of frame portions is changed, the pair of frame portions is displaced and the operation damping mechanism Bc generates the damping force at the time of the displacement of the pair of displacement members, thereby restraining a rapid displacement. In addition, because a mechanism for applying the damping force in the operation damping mechanism Bc may be constituted with a friction force, a simple configuration and a reduced cost may be achieved.

According to the first and second embodiments, the operation damping mechanism Bc includes the cylinder portion (the slide holder 21, the slide support member 36) serving as one of the pair of displacement members and formed to be coaxial with the main axis X of the reinforcement member Ba along a longitudinal direction thereof, the inner fitting portion (the inner cylinder 12) serving as the other of the pair of displacement members and internally fitted to the cylinder portion (21, 36) in a state to be coaxial with the main axis X, the friction member 24 being in contact with either one of an inner periphery of the cylinder portion (21, 36) and an outer periphery of the inner fitting portion (12), and the spring body 25 biasing the friction member 24 in a direction where the friction member 24 makes contact with either one of the inner periphery of the cylinder portion (21, 36) and the outer periphery of the inner fitting portion (12).

Accordingly, in a case where the pair of frame portions is displaced relative to each other, the cylinder portion (the slide holder 21, the slide support member 36) and the inner fitting portion (the inner cylinder 12) are relatively displaced to each other. At the time of the aforementioned displacement, the friction member 24 makes contact with the inner periphery of the cylinder portion (21, 36) or the outer periphery of the inner fitting portion (12) by the biasing force of the spring body 25 so as to damp the relative movement between the cylinder portion (21, 36) and the inner fitting portion (12). Accordingly, the friction force that is specified by the biasing force may cause the relative displacement of the pair of frame portions to be damped.

According to the third embodiment, the operation damping mechanism Bc includes the main cylindrical body 41 serving as one of the pair of displacement members and formed to be coaxial with the main axis X of the reinforcement member Ba along a longitudinal direction thereof, the shaft body 42 serving as the other of the pair of displacement members and internally fitted to the main cylindrical body 41 in a state to be coaxial with the main axis X, and the damping cylindrical body 44 being tightly in contact with an inner periphery of the main cylindrical body 41 and an outer periphery of the shaft body 42, the damping cylindrical body 44 being elastically deformable and flexible.

Accordingly, in a case where the pair of frame portions is displaced relative to each other, the main cylindrical body 41 and the shaft body 42 are relatively displaced to each other. At the time of the aforementioned displacement, the damping force may be applied to the relative displacement of the pair of frame portions by resistance generated when the damping cylindrical body 44 is elastically deformed.

According to the fourth embodiment, the operation damping mechanism Bc includes the main case 51 including a cylindrical form and serving as one of the pair of displacement members, the main case 51 including the tapered inner surface 51s at an inner periphery, the tapered inner surface 51s of which diameter decreases towards one end of the cylindrical form along the main axis X, the shaft portion 52 serving as the other of the pair of displacement members and fitted to an inner portion of the main case 51 in a state to be coaxial with the main axis X, the chuck member 55 being slidable relative to the tapered inner surface 51s of the main case 51 and an outer peripheral surface of the shaft portion 52, and the compression coil spring 56 generating a biasing force for causing an inner peripheral surface of the chuck member 55 to contact with the outer peripheral surface of the shaft portion 52 in a state where an outer peripheral surface of the chuck member 55 is in press-contact with the tapered inner surface 51s of the main case 51.

Accordingly, the chuck member 55 makes press-contact with the tapered inner surface 51s of the main case 51 by the biasing force of the compression coil spring 56, and at the same time, the chuck member 55 makes press-contact with the outer peripheral surface of the shaft portion 52 by the biasing force of the compression coil spring 56. In a case where the pair of frame portions is displaced relative to each other, the damping force may be applied to the relative displacement of the pair of frame portions by the friction force generated between the tapered inner surface 51s of the main case 51 and by the friction force generated between the chuck member 55 and the shaft portion 52. In addition, by the adjustment of the biasing force of the compression coil spring 56, the necessary damping force may be obtained.

According to the first to ninth embodiment, the vehicle body reinforcement unit B further includes the displacement restraining mechanism Bb that generates the biasing force against one of a contraction displacement in a direction where a relative distance between the pair of frame portions decreases and an expansion displacement in a direction where the relative distance increases.

Accordingly, in a case where either the expansion displacement in which the relative distance between the pair of frame portions increases or the contraction displacement where the relative distance decreases occurs, the displacement restraining mechanism Bb generates the biasing force for restraining the displacement. That is, in circumstances where an external force is applied to displace the vehicle body frame, a biasing force that increases in association with increase of displacement may be applied in a direction for restraining the displacement, which appropriately restrains the displacement.

According to the second to eighth embodiments, the displacement restraining mechanism Bb includes the first biasing member restraining the expansion displacement and the second biasing member restraining the contraction displacement.

Accordingly, the first biasing member of the displacement restraining mechanism Bb applies the biasing force in a direction to restrain the expansion displacement in which the relative distance of the pair of frame portions of the vehicle body A increases. In addition, the second biasing member of the displacement restraining mechanism Bb applies the biasing force in a direction to restrain the contraction displacement in which the relative distance of the pair of frame portions of the vehicle body A decreases. Further, in a case where the vehicle body A vibrates in a displacement direction, the biasing force may be applied from the displacement restraining mechanism Bc in either direction (i.e., reciprocating direction).

According to the first and second embodiments, the displacement restraining mechanism Bb is provided at one end portion of the reinforcement member Ba, the displacement restraining mechanism Bb being supported at one of the pair of frame portions, and the support member 28 at which the other end portion of the reinforcement member Ba is supported is supported at the other of the pair of frame portions, the support member 28 including the recess surface 28b to which the other end portion of the reinforcement member Ba is fitted to retain the position of the main axis X of the reinforcement member Ba.

Accordingly, the position of the main axis X of the reinforcement member Ba may be held at a predetermined position.

According to the eighth embodiment, the vehicle body reinforcement unit B further includes the biasing force release portion Bd releasing the biasing force applied from the displacement restraining mechanism Bb. The reinforcement member Ba includes the first displacement member (the sub unit Q) that includes the biasing force release portion Bd and the second displacement member (the main unit P) of which connection position relative to the first displacement member is changeable.

Accordingly, the biasing force release portion Bd may release the biasing force.

According to the first to third embodiments, the reinforcement member Ba includes the screw-type length adjustment portion L adjusting the distance between the first end portion corresponding to one of the pair of frame portions and the second end portion corresponding to the other of the pair of frame portions.

Accordingly, even in a case where the relative distance between the pair of frame portions varies (different), the positions of the respective end portions of the reinforcement member Ba may be appropriately specified by the screw-type length adjusting portion L.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle body reinforcement unit comprising:
a reinforcement member disposed between a pair of frame portions of a vehicle body and including a first displacement member and a second displacement member that displace relative to each other in association with a relative displacement of the pair of frame portions;
a damping mechanism that applies a damping force to a relative operation between the first displacement member and the second displacement member;
the pair of frame portions moving in a contracting direction when a relative distance between the pair of frame portions decreases, and moving in an expansion direction when the relative distance between the pair of frame portions increases;
a first biasing spring applying a biasing force against the second displacement member in the expansion direction when the pair of frame portions move in the contracting direction;
a second biasing spring applying a biasing force in the contracting direction against the second displacement member when the pair of frame portions move in the expansion direction; and
the damping mechanism including:
a cylindrical body serving as the first displacement member and formed to be coaxial with an axis of the reinforcement member along a longitudinal direction of the reinforcement member;
a shaft body serving as the second displacement member and internally fitted to the cylindrical body in a state to be coaxial with the axis of the reinforcement member; and
a damping cylindrical body being tightly in contact with an inner periphery of the cylindrical body and an outer periphery of the shaft body, the damping cylindrical body being elastically deformable and flexible.

2. The vehicle body reinforcement unit according to claim 1, wherein the reinforcement member includes a screw adjustment portion configured to adjust a distance between a first end portion corresponding to one of the pair of frame portions and a second end portion corresponding to the other of the pair of frame portions.

3. A vehicle body reinforcement unit comprising:
a reinforcement member connected to a pair of frame portions of a vehicle body, the reinforcement member including a first displacement member and a second displacement member that displace relative to each other in association with a relative displacement of the pair of frame portions, the first displacement member possessing an inner periphery and the second displacement member possessing an outer periphery;
the pair of frame portions moving in a contracting direction when a relative distance between the pair of frame portions decreases, and moving in an expansion direction when the relative distance between the pair of frame portions increases;
a first biasing member applying a biasing force against the second displacement member in the expansion direction when the pair of frame portions move in the contracting direction;
a second biasing member applying a biasing force in the contracting direction against the second displacement member when the pair of frame portions move in the expansion direction; and
a damping cylindrical body in press contact with the inner periphery of the first displacement member and the outer periphery of the second displacement member, the damping cylindrical body being elastically deformable and flexible to apply a damping force to relative operation between the first displacement member and the second displacement member.

4. A vehicle body reinforcement unit comprising:
a cylindrical member extending in a longitudinal direction, the cylindrical member possessing an inner surface, a first end, and a second end opposite the first end in the longitudinal direction;
a bracket member extending in the longitudinal direction and connected to a first frame portion of a vehicle body, the bracket member fixed to the cylindrical member;
a shaft member extending in the longitudinal direction and connected to a second frame portion of the vehicle body, the shaft member being internally fitted to the cylindrical member and coaxial with the cylindrical member, the shaft member being configured to move relative to the cylindrical member in association with a relative movement between the first frame portion and the second frame portion of the vehicle body, the shaft member possessing an outer surface;
an adjustment nut threaded to the shaft member;
the first frame portion and the second frame portion of the vehicle body moving in an inward direction when a distance between the first frame portion and the second frame portion decreases, and the first frame portion and the second frame portion of the vehicle body moving in an outward direction when the distance between the first frame portion and the second frame portion increases;
a first biasing member between the adjustment nut and the shaft member, the first biasing member applying a biasing force against the adjustment nut and the shaft member in the inward direction when the distance between the first frame portion and the second frame portion increases; and
a second biasing member between the outer surface of the shaft member and the inner surface of the cylindrical member, the second biasing member applying a biasing force against the shaft member and the cylindrical member in the outward direction when the distance between the pair of frame portions decreases.

5. The vehicle body reinforcement unit according to claim 4, further comprising a damping cylindrical body in press contact with the inner surface of the cylindrical member and the outer surface of the shaft member, the damping cylindrical body applying a viscoelastic force against a direction of the relative movement between the first frame portion and the second frame portion.

6. The vehicle body reinforcement unit according to claim 4, wherein the cylindrical member possesses a first portion that is thicker than a remaining portion of the cylindrical member, the larger diameter first portion of the cylindrical member possessing a first end and a second end opposite to the first end, the first biasing member located at the first end of the first portion and the second biasing member located at the second end of the first portion.

7. The vehicle body reinforcement unit according to claim 6, wherein the first portion of the cylindrical member possesses an outer surface provided with threads, the bracket member possessing an inner surface provided with threads, and the threads on the outer surface of the first portion of the cylindrical member being threadedly engaged with the threads on the inner surface of the bracket member.

* * * * *